July 16, 1940.  G. T. HUXFORD  2,207,921
TELEMETRIC CONTROLLER
Filed Feb. 20, 1937
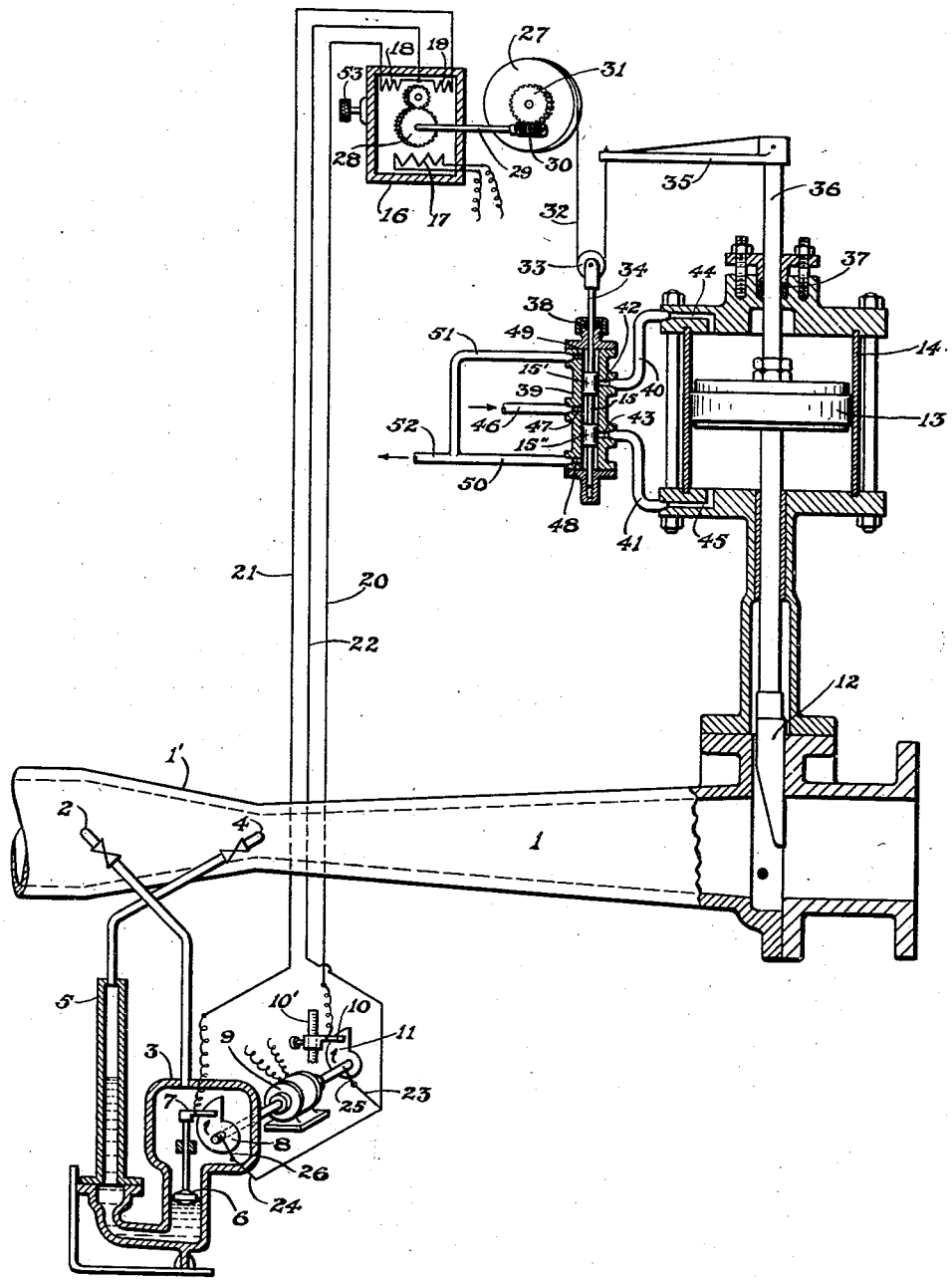
INVENTOR
*GEORGE T. HUXFORD*
BY
*Maxwell Barus*
ATTORNEY Patented July 16, 1940

2,207,921

UNITED STATES PATENT OFFICE 2,207,921

TELEMETRIC CONTROLLER

George T. Huxford, North Kingstown, R. I., assignor to Builders Iron Foundry, Providence, R. I., a corporation of Rhode Island Application February 20, 1937, Serial No. 126,911

1 Claim. (Cl. 137—152.5)

This invention relates to methods of and apparatus for telemetrically controlling a dependent quantity by a master quantity. An object is to provide a novel control system wherein a sensitive pacer means immediately responsive to slight changes in the desired relation between the master and dependent quantities effectively controls a more powerful regulating means to promptly restore said relation. The invention utilizes pacer means of low inertia, capable of instant starting in response to signals representing even slight variations in the relation between master and dependent quantities, in conjunction with means of greater power, movable only when necessary under control of the pacer means, for regulating the dependent quantity.

Another object of the invention is the provision of a control system wherein the pacer means, though capable of instant response to extremely small variations, will not cause undesirable fluctuation or hunting of the regulating means. At the same time, the pacer means acts as an accurate integrator, bringing the regulatory means promptly into action upon the accumulation of a predetermined variation from the desired relation between the quantities.

A further object comprises the provision of a novel and highly accurate control system for telemetrically governing the dependent quantity under the control of signals corresponding as a function of time with the master quantity.

In addition, the invention provides an integrator-type receiver responsive to time function signals commensurate with the master quantity, in combination with follow-up means responsive to the regulation of the dependent quantity. The invention more specifically includes a pacer motor responsive to time-function telemetric signals in combination with other motor means controlled jointly by the pacer motor and by a follow-up means for obtaining an especially sensitive and accurate control.

Other features and advantages of the invention will be hereinafter described and claimed.

The accompanying drawing shows a diagrammatic elevation, with parts in section, of an embodiment of my invention. The latter is illustrated as applied to the control of the rate of flow of fluid in a conduit, though it will be understood that such is merely illustrative and that the use of the invention is not restricted to the control of any particular variable quantity.

Referring to the drawing, the flow of liquid through the conduit 1 is caused to produce a differential pressure in any suitable way, as through the provision of a Venturi section 1' in said conduit. A high pressure tap 2 is connected to leg 3 of a conventional U-tube containing a manometric liquid such as mercury, while the low pressure tap 4 is connected to leg 5 of said U-tube. A float 6 carrying a contactor 7 rests upon the surface of the manometric liquid and is thus positioned proportionally to the differential pressure between points 2 and 4, or, in other words, in proportion to the square of the rate of flow of the liquid in the conduit 1. Contactor 7 engages a cam 8 which is continuously driven at a constant speed by synchronous motor 9. Cam 8 is so shaped that the period of engagement of contactor 7 therewith in each cycle is proportional to the square root of the differential pressure between points 2 and 4 and is thus proportional to the rate of flow of liquid in the conduit 1.

A manually settable contactor 10 cooperates with a cam 11 which is also driven continuously at the same constant speed as cam 8. Cam 11 may conveniently be driven by the motor 9. Said cam 11 is of lineal form, so that the period of engagement of contactor 10 therewith in each cycle is proportional to the displacement of said contactor from its zero position, and thus is proportional to the manually predetermined flow rate.

Positioned in conduit 1 downstream with respect to the tap 4 is a valve 12 for regulating the flow of liquid in said conduit. Valve 12 is operated by a piston 13 in cylinder 14, under the control of pilot valve 15, which in turn is controlled by a suitable reversible pacer motor 16. The latter is here illustrated as of the well-known shading coil type. Field coil 17 of said motor is continuously connected to alternating current supply lines. Shading coils 18, 19 of motor 16 are connected by wires 20, 21, respectively, with contactors 10 and 7, and by wire 22, wires 23, 24 and brushes 25, 26, with the respective cams 11 and 8. Said shading coils 18, 19, as is well understood, act as secondary windings of a transformer of which the field coil 17 is the primary. When both coils 18 and 19 are open or shorted, motor 16 is locked in position, but when either coil 18 or 19 alone is shorted, motor 16 will operate. Thus, as long as contactors 7 and 10 are concurrently in engagement with the respective cams 8 and 11, the shading coils 18 and 19 are concurrently energized, and motor 16 is stationary. When, however, either contactor 7 or 10 is engaged with its cam at the time when the other is not, the corresponding coil 18 or 19 will be energized while the other is open-circuited, and the motor 16 will operate in the corresponding direction. It may be noted in this connection that the contactors 7 and 10 engage their respective cams at the same point in each cycle so that the signals from contactors 7 and 10 commence at the same point, the termination of said signals in each cycle depending upon the settings of said contactors with respect to said cams.

The pacer motor 16 drives a pulley 27, through gear 28, shaft 29, worm 30, and worm wheel 31. A cord 32 wound around said pulley is passed under pulley 33 on a stem 34 of pilot valve 15. Said cord is thence attached to an arm 35 on rod 36 of piston 13. Piston rod 36 and pilot valve stem 34 extend through suitable stuffing boxes 37, 38 in cylinders 14 and 39 respectively. Conduits 40, 41 lead from ports 42, 43, respectively, in pilot valve casing 39 to ports 44, 45 in piston cylinder 14. A conduit 46 from a suitable source of fluid under pressure communicates with a port 47 in casing 39, while outflow ports 48, 49 in said casing communicate respectively with branches 50, 51 of conduit 52.

The operation of the apparatus above described is as follows:

The operator sets the desired rate at the master transmitter by appropriately adjusting contactor 10 with respect to cam 11, so that said cam and contactor are in engagement for a time duration in each cycle corresponding to the desired rate as shown by the position of contactor 10 on scale 10'. The contactor 7 and cam 8 of the dependent transmitter are in engagement for a time duration in each cycle proportional to the actual flow rate in the conduit 1. In each cycle the master and dependent transmitters operate to produce signals starting simultaneously and ending as the trailing edges of the cams 11 and 8 leave the respective contactors 10 and 7. Assuming that the desired control rate has been raised by the operator to a higher value than the actual rate, it is apparent that contactor 10 is in engagement with cam 11 for a longer period than is contactor 7 with cam 8, wherefore coil 18 of pacer motor 16 is energized for a longer period than is coil 19. If, on the other hand, the desired control rate has been lowered below that of the actual rate, the coil 19 is energized for a longer time than is coil 18. Thus in each cycle in which coils 18 and 19 are energized for unequal periods the pacer motor 16 operates in the direction determined by the coil which is energized for the longer period and through an extent corresponding to the difference in the durations of energization of said coils. This rotation of motor 16 is transmitted to pulley 27 and pilot valve 15.

If, for example, the operator sets contactor 10 of the master transmitter to a higher rate than that actually present in conduit 1, the resultant energization of pacer motor coil 18 while coil 19 is de-energized drives pulley 27 in such direction as to unwind cord 32 and to lower pilot valve 15. As soon as said pilot valve is lowered sufficiently to uncover port 43, fluid under pressure flows from conduit 46 through port 47, port 43, conduit 41, and port 45, to the underside of piston 13. At the same time the pilot valve 15 uncovers port 42 and places the latter in communication with exhaust port 49, so that the portion of cylinder 14 above the piston 13 is connected to exhaust. Said piston is thus moved upwardly, raising the valve 12 and increasing the flow rate in conduit 1. The raising of piston 13 and valve 12 also raises the arm 35, drawing upwardly the attached end of cord 32, so that, as soon as pulley 27 ceases rotating, the pilot valve 15 is restored into the position illustrated, wherein it closes both ports 42 and 43. This raising of valve 12 may be sufficient to bring the flow rate to the desired increased value, but, if it is not, said action is repeated in one or more successive cycles, the pacer motor and pulley 27 lowering the cord 32 in each cycle so that pilot valve 15 is again lowered into position for causing piston 13 to be raised, and said piston restoring said pilot valve to its normal position, until valve 12 assumes the proper position in which the desired new flow rate is obtained.

If the operator sets contactor 10 to a lower rate, pacer motor 16 turns in the reverse direction, rotating pulley 27 in such direction as to wind up cord 32 and raise the pilot valve 15. As soon as said pilot valve is raised into a position wherein port 42 is opened, fluid under pressure from conduit 46 flows through said port and thence through pipe 40 and port 44 to the upper side of piston 13. At the same time, port 43 has been placed in communication with exhaust port 48, so that the portion of cylinder 14 below the piston is open to exhaust. Piston 13 is thus now lowered, lowering the valve 12 and decreasing the rate of flow in the conduit 1. As piston 13 moves downwardly, arm 35 lowers the attached end of cord 32, wherefore, when pulley 27 ceases winding said cord, the pilot valve 15 is lowered into its normal position shown in the drawing, wherein ports 42 and 43 are closed. This action is repeated in each cycle, if necessary, until the desired lower flow rate is attained.

With valve 12 set in the position corresponding to the desired rate, any variation from said rate in the conduit 1 will result in operation of pacer motor 16 to wind or unwind the cord 32 and to shift pilot valve 15 in its casing. The portions 15', 15" of said valve which normally cover the ports 42, 43 may be of such extent as to permit said valve simply to oscillate, without opening said ports, for minor or insignificant fluctuations in the flow rate, but upon the accumulation of sufficient variations in one direction or the other, said pilot valve exposes said ports to cause actuation of piston 13 to restore the set rate. The pacer-motor and pilot-valve arrangement aforesaid thus may function as a form of integrator.

It will be further noted that, while the pacer motor and pilot valve may be of low inertia, sensitively responsive even to minute variations in the dependent quantity, the piston 13 provides rugged means of adequate power for insuring effective operation of the valve 12. The piston 13 at the same time is under the precise control of the pacer motor and pilot valve, and moves only when necessary to effect the desired regulation. The follow-up connection between piston 13 and the pilot valve enables said piston to move in each cycle an extent corresponding with the extent of operation of the pacer motor. Hunting is thus eliminated, and an especially accurate and sensitive control is obtained.

With a negligible amount of movement of pilot valve 15 from normal position to open ports 42, 43, the apparatus described above controls the average flow rate exactly to that set over a period of time. With a finite movement of said valve for opening said ports, the maximum possible departure of total quantity is the same regardless of length of operation.

While the shading coil type of pacer motor presents the advantages noted above, it will be understood that any other type of reversible motor capable of prompt response may be utilized. Thus, small synchronous reversible motors of low inertia are known in the art and may be employed as pacer motors. Magnetic brakes well-known in the art for preventing over-travel of motors may also be employed. It may be observed, however, in this connection that the shading-coil type of motor, with field coil 17 continuously alive, has the further advantage of retaining its armature in its then position between operations, due to inherent braking action. Also the shading coils 18, 19 operate at an induced voltage only, so that the signaling circuits to the transmitters carry minimum operating hazards, and the motor is responsive to small currents in said circuits.

The speed of the pacer motor 16 may be varied in any well known manner, so as to give maximum speed of valve 12 without hunting under a variety of conditions. A conventional speed adjusting element is illustrated for this purpose at 53.

By suitable proportioning of the parts, such as the ratio of the gearing between motor 16 and pulley 27, the diameter of said pulley, the size of the ports and conduits in the pilot valve and piston chamber, or any of the foregoing, the speed of operation of the pilot valve by the follow-up arm 35 may be made greater than its operation by the pulley 27. This enables minute adjustments of the valve 12 to be effected. Said parts may, of course, be proportioned to attain any desired relative speed of operation of the pilot valve by the pulley 27 and follow-up arm 35.

It will be apparent that, in lieu of a single motor 9 for driving the cams of the master and dependent transmitters, said cams may be driven by separate synchronous motors. Any suitable means well-known in the art may be employed for automatically maintaining the cams in exact synchronism when separate motors are utilized, but it may be observed that even if said cams be not exactly synchronized, with consequent slight operation of motor 16 forward and backward in each cycle, such operation will not be objectionable so long as it is within the limits of movement of the pilot valve with ports 42 and 43 closed.

Subject matter herein disclosed but not claimed is covered by the pending application of Ed S. Smith, Serial No. 126,913, filed February 20, 1937.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

In a telemetric controller, transmitter means responsive to a master quantity for cyclically transmitting signal impulses corresponding to said master quantity, transmitter means responsive to a dependent quantity for cyclically transmitting signal impulses corresponding to said dependent quantity, pacer means controlled jointly by said transmitter means for movement in each of a series of successive transmitting cycles through an extent and in a direction corresponding to variations from a given relation between the master and dependent quantities, means including a fluid pressure motor for regulating said dependent quantity, and means controlled by said pacer means for algebraically integrating motion thereof and for energizing said motor upon the accumulation of a predetermined amount of said integrated motion.

GEORGE T. HUXFORD.